United States Patent
Tullis

(10) Patent No.: US 9,639,455 B2
(45) Date of Patent: *May 2, 2017

(54) AUTONOMOUS MEDIA VERSION TESTING

(71) Applicant: ELECTRONIC ARTS INC., Redwood City, CA (US)

(72) Inventor: Leslie Tullis, Redwood City, CA (US)

(73) Assignee: Electronic Arts Inc., Redwood City, CA (US)

(*) Notice: Subject to any disclaimer, the term of this patent is extended or adjusted under 35 U.S.C. 154(b) by 5 days.

This patent is subject to a terminal disclaimer.

(21) Appl. No.: 14/627,919

(22) Filed: Feb. 20, 2015

(65) Prior Publication Data

US 2015/0186247 A1    Jul. 2, 2015

Related U.S. Application Data

(63) Continuation of application No. 14/135,269, filed on Dec. 19, 2013, now Pat. No. 8,978,013.

(60) Provisional application No. 61/888,918, filed on Oct. 9, 2013.

(51) Int. Cl.
G06F 9/44      (2006.01)
A63F 9/24      (2006.01)
G06F 11/00     (2006.01)
G06F 11/36     (2006.01)

(52) U.S. Cl.
CPC ............ *G06F 11/3688* (2013.01); *G06F 8/71* (2013.01); *G06F 11/368* (2013.01); *G06F 11/3664* (2013.01)

(58) Field of Classification Search
CPC .... G06F 8/71; G06F 11/3664; G06F 11/3668; G06F 11/3672; G06F 11/368; G06F 11/3688; G06F 11/3692; G07F 17/323; G07F 17/3234
USPC ............... 717/124–135; 463/25; 714/45
See application file for complete search history.

(56) References Cited

U.S. PATENT DOCUMENTS

| | | |
|---|---|---|
| 6,015,344 A | 1/2000 | Kelly et al. |
| 6,804,796 B2 | 10/2004 | Gustavsson et al. |
| 8,185,877 B1 | 5/2012 | Colcord |
| 8,241,116 B2 | 8/2012 | Ocko et al. |
| 8,317,610 B2 | 11/2012 | Ocko et al. |
| 8,333,659 B2 | 12/2012 | Driemeyer et al. |
| 8,529,327 B2 | 9/2013 | Gurovich et al. |
| 8,683,440 B2 | 3/2014 | Pasternak |

(Continued)

OTHER PUBLICATIONS

Chopra, Paras, "The Ultimate Guide to A/B Testing," <http://www.smashingmagazine.com/2010/06/24/the-ultimate-guide-to-a-b-testing/>, Jun. 24, 2010, p. 1-21.*

(Continued)

*Primary Examiner* — Qing Chen
(74) *Attorney, Agent, or Firm* — Lowenstein Sandler LLP

(57) ABSTRACT

Autonomous media version testing is described. A method may include testing, by a processing device of a server and without human interaction, a plurality of versions of a game, each having a different set of test conditions, using information received from play of the plurality of versions of the game after a first game move has been made in the game. The method may also include determining, by the processing device and without human interaction, which of the plurality of versions of the game to publicly release based on the testing.

19 Claims, 10 Drawing Sheets

(56) References Cited

U.S. PATENT DOCUMENTS

| | | |
|---|---|---|
| 8,771,062 B2 | 7/2014 | Ocko et al. |
| 8,788,243 B2 | 7/2014 | Peterson et al. |
| 2001/0052089 A1 | 12/2001 | Gustavsson et al. |
| 2002/0049962 A1* | 4/2002 | Kelbaugh ............ G06F 11/3664 717/128 |
| 2006/0121972 A1* | 6/2006 | Walker .................. G07F 17/32 463/16 |
| 2006/0211464 A1* | 9/2006 | Malobabic .......... A63F 3/00643 463/14 |
| 2009/0163272 A1 | 6/2009 | Baker et al. |
| 2010/0328066 A1 | 12/2010 | Walker et al. |
| 2011/0161825 A1* | 6/2011 | Tierney ............... G06F 11/3672 715/736 |
| 2011/0184956 A1 | 7/2011 | Dantsker et al. |
| 2011/0212784 A1 | 9/2011 | Ocko et al. |
| 2011/0296383 A1 | 12/2011 | Pasternak |
| 2012/0021814 A1 | 1/2012 | Gurovich et al. |
| 2012/0071236 A1 | 3/2012 | Ocko et al. |
| 2012/0077596 A1 | 3/2012 | Ocko et al. |
| 2012/0209571 A1 | 8/2012 | Peterson et al. |
| 2013/0035981 A1 | 2/2013 | Brown et al. |
| 2013/0035989 A1 | 2/2013 | Brown et al. |
| 2013/0084927 A1 | 4/2013 | Ocko et al. |
| 2013/0184059 A1 | 7/2013 | Costello et al. |
| 2013/0184060 A1 | 7/2013 | Costello et al. |
| 2013/0184079 A1 | 7/2013 | Costello et al. |
| 2014/0109066 A1 | 4/2014 | Dhanda |

OTHER PUBLICATIONS

Chopra, Paras, "Advanced A/B Testing Tactics That You Should Know," <http://online-behavior.com/testing/advanced-ab-testing-tactics-1356>, Dec. 2010, p. 1-6.*

Ozolins, Matthew, "Split Testing Guide for Online Stores," <http://www.webics.com.au/blog/google-adwords/split-testing-guide-for-online-retailers/>, Aug. 27, 2012, p. 1-4.*

* cited by examiner

AUTONOMOUS MEDIA VERSION TESTING

This application is a continuation application of U.S. patent application Ser. No. 14/135,269, filed Dec. 19, 2013, which claims priority to U.S. Provisional Application No. 61/888,918, filed Oct. 9, 2013 which are hereby incorporated by reference in their entirety.

TECHNICAL FIELD

This disclosure relates to the field of media testing and, in particular, to live autonomous version testing of media items.

BACKGROUND

A/B testing is the practice of releasing two versions of a media or service that are identical except for one variable. The product manager then compares the engagement and monetization of live users on each version and works with the engineering team to implement the superior version globally. A single A/B test may take 3-14 days and can be expensive because it requires ongoing support from software engineers and constant attention from the product manager who chooses what to test and interprets the results. As a result, only a few features or price points are A/B tested per game per month and optimization of even a single feature may not be reached.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
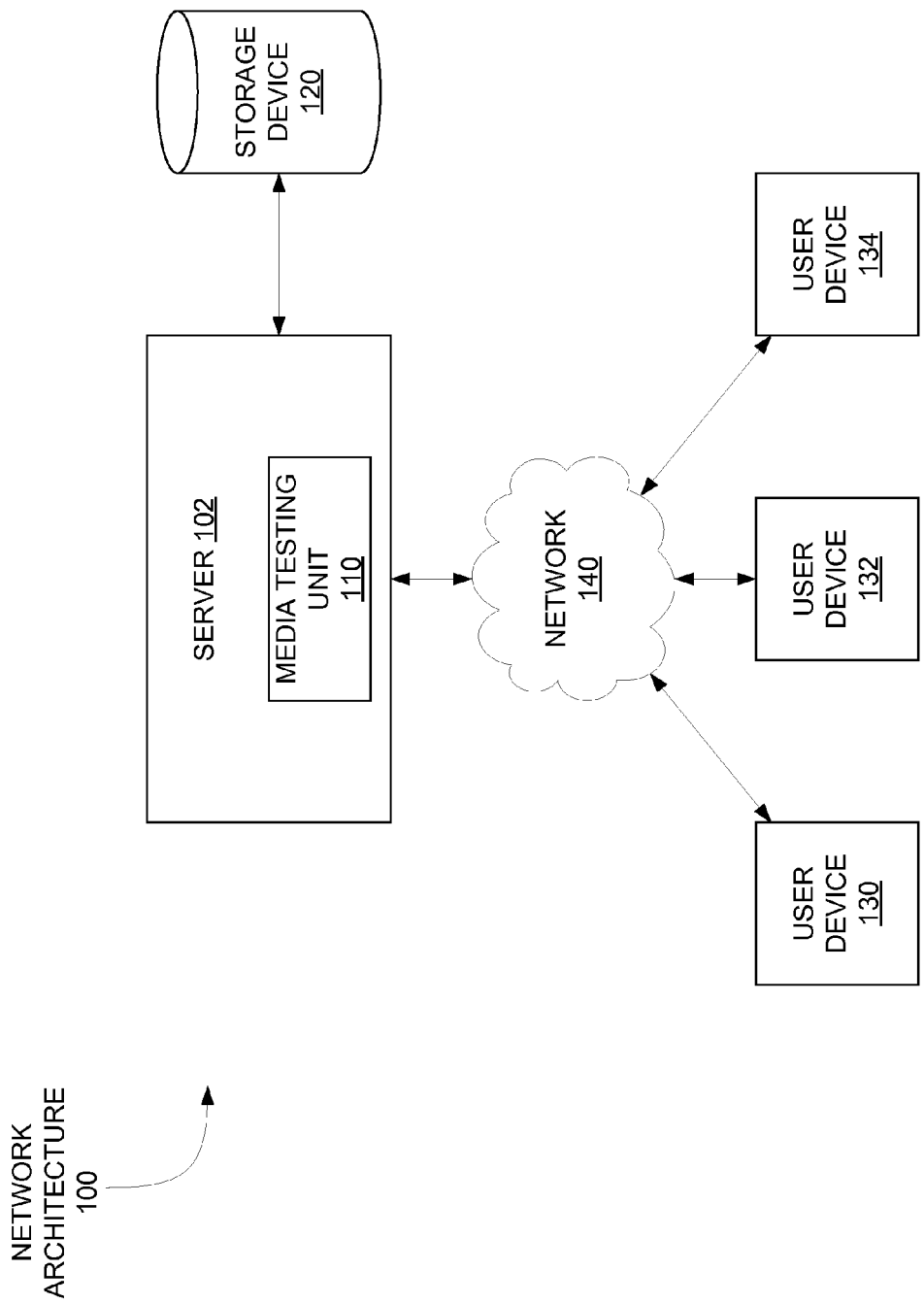
FIG. 1 is a block diagram illustrating an exemplary network architecture in which embodiments of the present disclosure may be implemented.

Embodiments are described for autonomous media version testing. In an illustrative embodiment, a media test is performed on a game (e.g., chess) against a computer opponent. A human player receives gold stars for winning and can display their number of gold stars to other friends in the game. In a first version of the game, a player receives one gold star when he beats his opponent. In a second version of the game, a player receives two gold stars when he beats his opponent. A server assigns each new player a unique identifier when they log in for the first time. The server sends out alternating conditions to each player and maintains a record of which player received which conditions. Some (e.g., half) of the players will receive the "one gold star" game condition and the others will receive the "two gold star" game condition.

In one embodiment, when a player makes the first game move of his first game, a time-stamped confirmation will be received by the server, along with the player's test identifier. The server will now include this test identifier in the N-count for that condition. When the N-count for each condition reaches 10,000 the server stops sending out that condition. Thus, the server will not include in its N-count any test identifiers associated with players who have not made at least one game move, since including such players' data would result in inaccurate analysis. The player's game will continually send a result metric, such as total net revenue for that player, as well as the test identifier to the server. This may happen either when the player's result metric changes (i.e., only when that player spends money), or periodically according to an interval of time, whether or not that player's result metric has changed (i.e., every 5 minutes).

When, for example, 180 minutes have passed since a player made the first game move of his first game, the server finalizes the test metric values (total net revenue in this case) for that player and does not accept new updates. When all players' test metric values have been finalized, the server calculates total net revenue for each condition. The server compares the two totals, chooses the version of the game which contains the set of conditions resulting in the highest total net revenue, and sends that set of conditions to players as they log in. The server may then perform a subsequent test.

Embodiments of the present disclosure allow for a plurality of versions of a game to be tested on a restricted audience of users (for instance, users in a single region or country) prior to unrestricted global launch. Depending on the user flow, dozens or even hundreds of media tests may be run and the results rolled out before the unrestricted global launch. After this launch, continued sampling provides constant tune-ups for the length of the live game service, without requiring the constant 24-hour oversight of a product manager and software engineer.

While embodiments may be described in relation to certain media, in alternative embodiments, the methods and apparatus discussed herein may also be used with other types of media and also testing of a service. For example, in alternative embodiments, the methods described herein could be used to test websites, storefronts or services accessible on web or mobile devices, storefronts or services accessible on televisions or via devices connected to televisions (such as video game consoles, tablets, or set-top boxes), email marketing strategies, song or video preferences, and any other media or service where user response is desired and trackable.

This type of testing described herein allows an individual to avoid the costly and time-intensive processes having human administrators dictate tests and interpret results. It also allows for more in depth testing, as testing and analyzing the data received can be done on a much higher level, with fewer mistakes, and at a much faster rate when done without human interaction.

FIG. 1 is a block diagram illustrating an exemplary network architecture in which embodiments of the present disclosure may be implemented. The network architecture 100 may include one or more servers 102 communicating with one or more user devices 130, 132, 134 over one or more networks 140, according to one embodiment. Network 140 can be a local area network (LAN), a wireless network, a telephone network, a mobile communications network, a wide area network (WAN), such as the Internet, or similar communication system. User devices 130, 132, 134 may be any type of computing device including server computers, gateway computers, desktop computers, laptop computers, game consoles, mobile communications devices, cell phones, smart phones, hand-held computers, tablets, smart TVs, set-top boxes, or similar computing devices. The user devices 130, 132, 134 may be variously configured with different features to enable viewing of visual content, such as images, videos, etc.

Server 102 may include a network-accessible server-based functionality, various data stores, and/or other data processing equipment. The server 102 may be implemented by a single machine or a cluster of machines. Server 102 may include, for example, computer system 1000 of FIG. 10. In one embodiment, server 102 includes media testing unit 110. Media testing unit 110 can receive a connection from a user device 130 and can also send data to user device 130. Upon connecting to a user device 130, the media testing unit 110 can send versions of games to all user devices 130 (players) connected to server 102. Server 102 may be one server or it may represent multiple servers. In one embodiment, when a first user connects a first user device 130 to server 102 and a second user connects a second user device 132 to server 102, server 102 may be the same server which handles both users' connections. In another embodiment, when a first user connects a first user device 130 to server 102 and a second user connects a second user device 132 to server 102, server 102 may represent different servers, so that each user connects to a different server.

In one embodiment, storage device 120 includes data store 222, in which may be stored sets of test conditions, test metrics to be tested, test metrics received from players (test metric values), player identifiers, and tests to be run. In response to a request from a user (e.g., received through one of user devices 130, 132, 134), media testing unit 110 can initiate a media test residing data store 222. In another embodiment, a user, administrator, or media testing unit may provide a test that was not previously stored in storage device 120.

In one embodiment, server 102 may include media testing unit 110 and storage device 120. In another embodiment, storage device 120 may be external to server 102 and may be connected to server 102 over a network or other connection. In other embodiments, server 102 may include different and/or additional components which are not shown here so as not to obscure the present disclosure. Storage device 120 may include one or more mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

Figure 2:
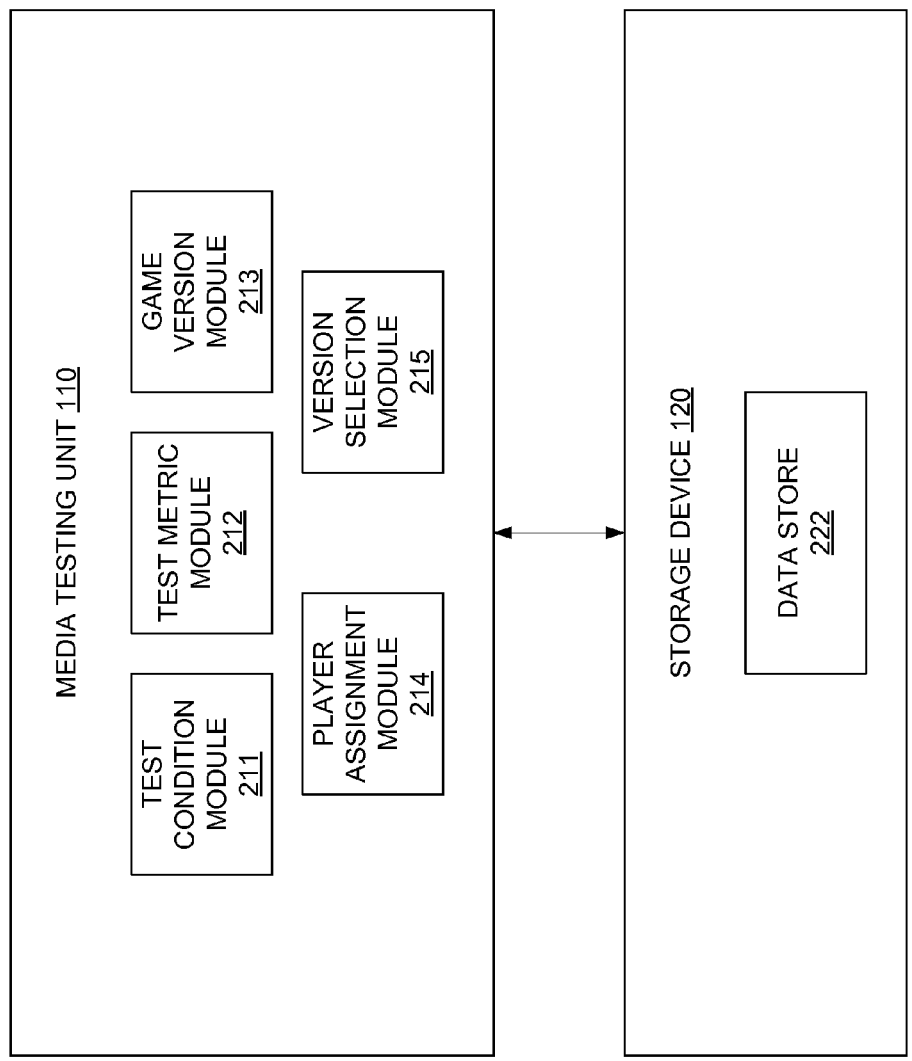
FIG. 2 is a block diagram illustrating a media testing unit, according to an implementation.

FIG. 2 is a block diagram illustrating a media testing unit 1100, according to an implementation of the present disclosure. In one embodiment, media testing unit 110 may include test condition module 211, test metric module 212, game version module 213, player assignment module 214, and version selection module 215. This arrangement of modules may be a logical separation, and in other embodiments, these modules or other components can be combined together or separated in further components, according to a particular embodiment. In one embodiment, storage device 120 may include data store 222. In one embodiment, media testing unit 110 maintains data store 222. Media testing unit 110 can receive a connection from a user device 130 or a computer application program and subsequently initiate a media test. Using input from data store 222, the various modules of media testing unit 110 can automatically perform new tests and send chosen versions of a game to future players.

In one embodiment, test condition module 211, test metric module 212, game version module 213, player assignment module 214, and version selection module 215 are used to perform a media test located in data store 222. Data store 222 may store, for example, various tests to be run, conditions to be tested, and metrics to be recorded. In one embodiment, data store 222 may also include recorded test metric values, results from previous tests, a log of player identifiers and with which tests those identifiers are associated, and different versions of games. In one embodiment, data store 222 may include a lookup table or other data structure for storing information.

Test condition module 211 may determine which test conditions to test next. In one embodiment, administrators maintain a list of test conditions, and specific priorities for testing the conditions in media testing. In this embodiment, a prioritized list of test conditions to be tested may be stored in data store 222. Test conditions may be prioritized according to the predicted impact the conditions would have on user experience, net revenue, or game publicity. In other embodiments, test conditions are prioritized according to constraints such as timing or plans for future tests. Test condition module 211 may receive test conditions as input from data store 222 in the form of a list, table, or other data structure. In another embodiment, test condition module 211 may receive test conditions directly from system administrators.

In one embodiment, a prioritized list of tests conditions to be utilized in maintained in data store 222 and therefore test condition module 211 needs only to draw a next set of test conditions from the list, in the order in which they are listed. In another embodiment, the test conditions stored in data store 222 are unorganized, and test condition module 211 must make a determination as to which test conditions to include in the next set of conditions to be tested. To prioritize test conditions, test condition module 211 may rely on data from previous tests, input from administrators, and other data stored in data store 222. For example, if analysis of previous tests by test condition module 211 results in the finding that a particular test condition yielded high net revenue, test condition module 211 may choose to run tests with similar test conditions before other unrelated conditions. In another example, if data store 222 contains test conditions that are subsets of other test conditions, test condition module may choose to include parent test conditions in an early set of test conditions, saving child test conditions for a later time. In this way, running media tests for only child test conditions that are derived from successful parent conditions can save time and monetary expense.

In one embodiment, test conditions may be categorized, either by an administrator or automatically by test condition module 211. Category labels may include: rewards, punishments, difficulty, timing, user interface, etc. Test condition module 211 may prioritize conditions based on the categories with which the test conditions are associated. For example, the test condition module 211 may determine that test conditions affecting the reward a player receives upon completion of a level make the most difference in net revenue. Therefore, test condition module 211 may choose to prioritize test conditions that are associated with a "reward" category. In another embodiment, the difficulty of achievements throughout the game may be prioritized. In one embodiment, test conditions may include, for example, a price point of in-game item, a size of reward, a timing of reward, an existence of a paywall, a timing of a paywall, an advertising presence, or a length of advertising. In another embodiment, a test condition may be any other testable variable.

Test metric module 212 may determine test metrics that may be stored in data store 222. In one embodiment, test condition module 211 may determine test conditions before test metric module 212 determines test metrics. In another embodiment, test metrics may be determined by test metrics module 212 before test condition module 211 determines test conditions. Test conditions and test metrics may also be determined simultaneously, independent of one another. In one embodiment, determining test metrics may include referencing a list of test metrics previously stored in data store 222 for future tests. An administrator may maintain a list of relevant test metrics, removing metrics if they become irrelevant and adding new metrics as needed. In one embodiment, possible test metrics may include total revenue, average revenue per user, average revenue per subscriber, retention rate, length of play session, conversion rate, or ad revenue. In another embodiment, a test metric may be any metric that is testable. Data store 222 may maintain a data structure containing which version of a game received which set of test conditions, and the associated test metrics. Since there is no issue with recording all test metrics in parallel, the list of test metrics in data store 222 may not necessarily be prioritized.

In another embodiment, relevant test metrics are determined automatically by test metric module 212, itself. Upon analysis of prior media tests, test metric module 212 may discover that, while a particular variable is not currently measured as a test metric, statistical differences exist between the variable contained in different versions of a game. For example, test metric module 212 may discover that when a player receives one gold star instead of two upon completion of the first level of a game, the player is more likely to repeat the first level in an effort to achieve a higher score. A test metric such as "likelihood of player to repeat level" may be added to the list of recorded metric values stored in data store 222 for future tests.

Game version module 213 creates a version of a game based on output from test condition module 211 and test metric module 212. In one embodiment, game version module 213 may create a version of a game that includes a set of test conditions determined by test condition module 211 and a list of test metrics to be recorded, as determined by test metric module 212. Game version module 213 maintains a list of which versions of a game contain which set of test conditions and test metrics. This list may be stored in data store 222. Game version module 213 may maintain a list of game versions to be tested. The list may be stored in data store 222 or elsewhere on or outside storage device 120. For example, game version module 213 may maintain a list of the next 50 game versions to be tested. Maintaining such a list may be beneficial to ensure tests may be run in parallel, or one after another in rapid succession. Automatically running tests in parallel and sequentially results in faster, more accurate, and more powerful testing—this is a large advantage for this type of media testing.

Player assignment module 214 ensures that proper versions of games are sent to the correct players and maintains a record of players and their test metric values. An N-count (the number of times a particular set of conditions should be tested) may be determined by an administrator or set by player assignment module 214 based on constraints such as timing and resource availability. The N-count may be stored in data store 222 or elsewhere. In one embodiment, player assignment module 214 tells server 102 which version of a game to send to a user device 130 when a player connects to server 102 via network 140. Server 102 then sends the appropriate version of the game to user device 130 via network 140. Player assignment module 214 may maintain a list, in data store 222 or elsewhere, of which player received which version of a game. In another embodiment, a list of players and which version they received is stored in a different container on storage device 120 or elsewhere.

Once a player has made a first game move of his game, test metric values for that player are recorded into data store 222 by player assignment module 214. Alternatively, results may be stored outside of data store 222 on storage device 120 or elsewhere. Results of players who have not yet made a first game move are not recorded. Once an N-count threshold has been met for a particular set of test conditions, player assignment module 214 may stop assigning to players the version of the game with that particular set of test conditions.

Once N-count thresholds have been met for all sets of test conditions currently being tested in a particular media test, the version selection module 215 determines which version of the game to publicly release and/or continue testing. After a threshold of time has passed since a player has made a first game move, version selection module 215 finalizes test metric values for that player by disallowing further recording of test metric values for that player. For example, if 180 minutes (or some other threshold of time) has passed since player A made a first game move, version selection module finalizes test metric values for player A by ceasing to record his test metric values.

In one embodiment, version selection module 215 may total test metric values for all players who received the same version of a game, and then compare against totaled test metric values from a different version of a game. The versions of the game that are being compared may have been run at the same time, or may have been run at different times. Based on the comparison of the totaled test metric values, version selection module 215 makes a determination of which version to release publicly and/or continue testing. For example, if version A is being compared against version B, and version A's test metric values are determined to be superior, version selection module 215 may determine to release version A to future players of the game. In another embodiment, version A may be released to future players of the game and at the same time a media test may run which compares version A against version C, a new version. In another embodiment, version A may be compared to version C, without releasing the game publicly.

Version selection module 215 may make a determination on which version of a game to publicly release and/or continue testing. For instance, the version selection module 215 may be set to favor any version of a game which records the highest net revenue. In another example, duration of playing time may be favored so that the game which totals the highest number of minutes played is chosen over the others. In yet another example, determination may be made based on comparisons of multiple test metrics. In other embodiments, the determination process may be more complex, allowing for statistical analysis using multivariate regression analysis, principle components analysis, factor analysis, or canonical correlation analysis. In other embodiments, redundancy analysis, correspondence analysis, artificial neural networks, or other statistical models may be used.

The above process may be repeated to generate complex networks of media tests, each test relying on data from a previous test. Because human interaction is not required in determining which test to perform, performing the test, analyzing results, and publicly releasing and/or continuing to test, media test networks may grow to be complex, ever-changing, and self-maintaining.

Figure 3:
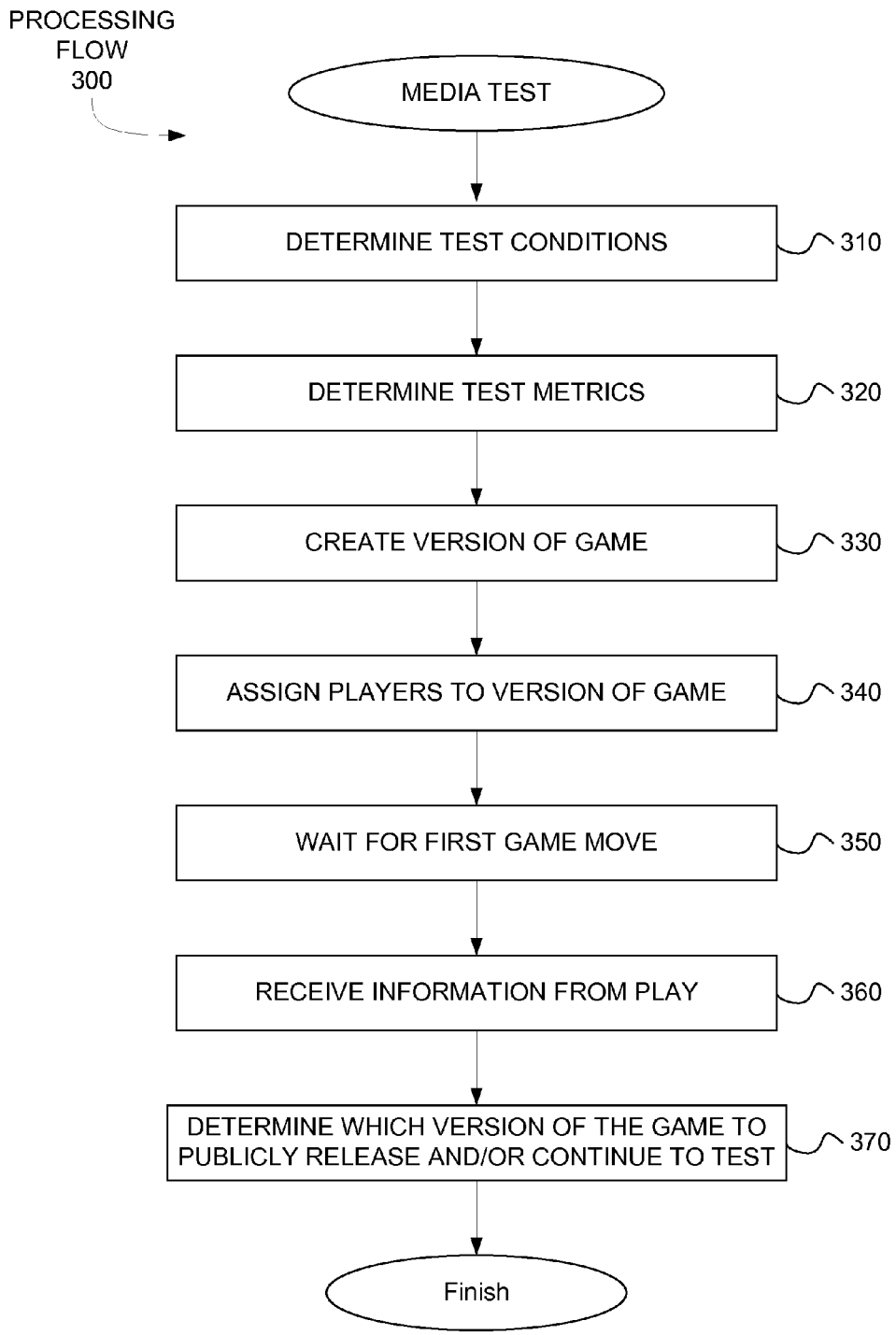
FIG. 3 is a flow diagram illustrating a media testing processing flow, according to an implementation.

FIG. 3 is a flow diagram illustrating a media testing processing flow, according to an implementation of the present disclosure. The processing flow method 300 may be performed by processing logic that comprises hardware (e.g., circuitry, dedicated logic, programmable logic, microcode, etc.), software (e.g., instructions run on a processing device to perform hardware simulation), or a combination thereof. Method 300 can determine which media test to perform, perform the test, analyze results, and publicly release and/or continuing testing. In one embodiment, media testing unit 110 may perform method 300.

Referring to FIG. 3, at block 310, method 300 determines which set of test conditions should be included in the current media test. Determinations may be made by test condition module 211. In one embodiment, test conditions have already been determined and are sitting in a queue in data store 222. Test conditions may be stored outside of data store 222, on storage device 120 or elsewhere. In another embodiment, test conditions may be determined at runtime by the test condition module 211. In yet another embodiment, test metrics may be determined before test condition module 211 determines test conditions. Method 300 may be performed in any order so as to fit the needs of the specific test to be run.

At block 320, test metrics are determined for the current media test. Test metrics may be determined by test metric module 212. In one embodiment, test metrics vary from test to test, and test metric module 212 must determine which metrics to use each time a new media test in run. In another embodiment, test metrics remain static for a certain type or number of media tests and test metric module may simply refer to a list maintained on data store 222 or elsewhere.

At block 330, a version of a game is created based on the test conditions and test metrics previously determined in 310 and 320. Game version creation may be performed by the game version module 213. In one embodiment, the software code is automatically written and assigned a version number. In another embodiment, game versions have already been created and are sitting in a queue on data store 222 or elsewhere.

At block 340, new players are assigned to a version of a game when user devices 130, 132, 134 connect to server 102 by network 140. Because server 102 may be one server or many servers, each user device connection may be handled by the same server, or each by a different server. Players may be assigned by player assignment module 214. In one embodiment, a record is maintained, by player assignment module 214, of which player received which version of a game, and a count of how many players have received different versions of the game. In one embodiment, the record in stored on data store 222. In another embodiment, the record is stored elsewhere on or outside of storage device 120.

At block 350, server 102 waits until a player makes his first game before starting to receive test metric values for that player. Once a player has made a first game move, test metrics values are received continually by server 102—either whenever the test metric values are updated for that player (i.e. whenever the player makes an in-game purchase) or automatically, according to an interval of time.

At block 360, server 102 receives information from play from a player of a game after the player has made a first game move. Information may be received via network 140. In one embodiment, the player assignment module 214 may receive the information. The information received may be the results of measuring test metric values as determined in 320.

At block 370, version selection module 215 may determine which version of the game to publicly release and/or continue to test. In one embodiment, determination may be made comparing the totaled results of test metric values in two or more versions of a game that were tested simultaneously. In another embodiment, a determination may be made by comparing results from two or more tests that were run sequentially. In another embodiment, a determination may be made by comparing results from two or more tests that were run at different times, and with unrelated sets of test conditions.

Figure 4:
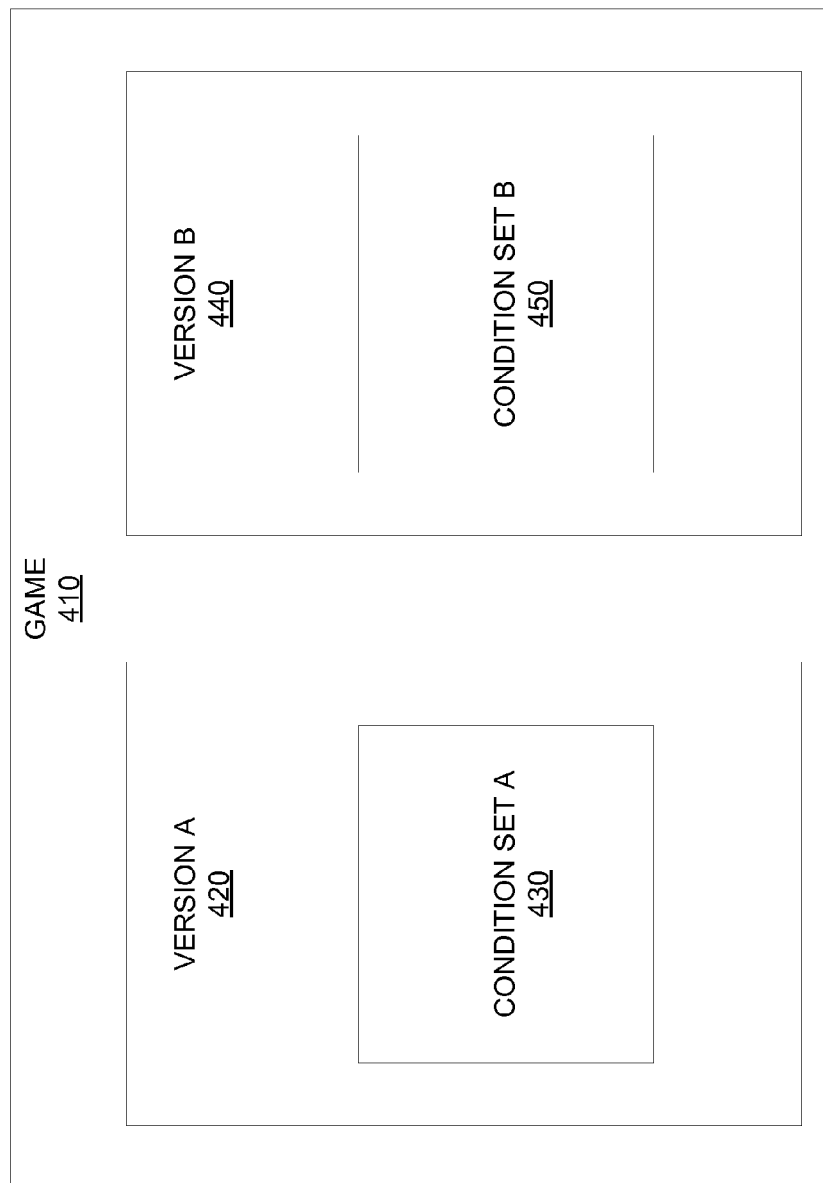
FIG. 4 is a block diagram illustrating versions of a game, each with a different set of test conditions, according to an implementation.

FIG. 4 is a block diagram illustrating versions of a game, each with a different set of test conditions, according to an implementation of the present disclosure. The various modules and components may be described in regards to their roles in performing a media test. Referring to FIG. 4, in one embodiment, game 410 may contain several subset versions, like version A 420 and version B 440. In another embodiment, game 410 may also include a third and fourth version. There is no limit to the number of versions that may be subsets of game 410.

In one embodiment, condition set A 430 was determined by test condition module 211, as was condition set B 450. In another embodiment, an administrator determined condition sets A 430 and/or B 450. In one embodiment, condition set A 430 may belong to version A 420 and condition set B 450 may belong to version B 440. However, version A 420 may not be strictly limited to condition set A 430, and likewise version B 440 with condition set 450. There may be other sets of test conditions within version A 420, version B 440, and any other version of game 410. When two or more conditions sets define a version multiple condition sets may be tested in parallel, or one may be tested while the other lays dormant.

Figure 5:
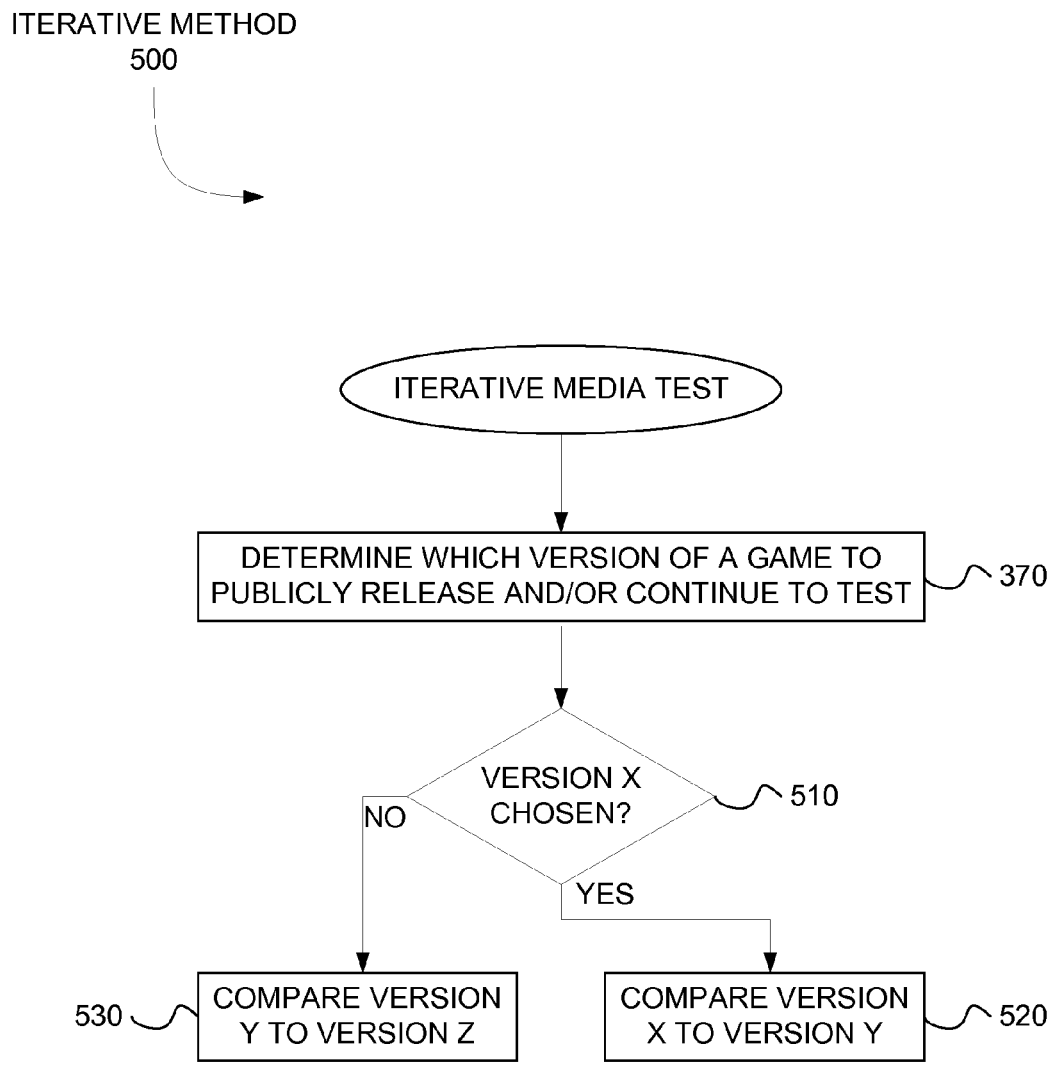
FIG. 5 is a flow diagram illustrating an iterative method of media testing, according to an implementation.

FIG. 5 is a flow diagram illustrating an iterative method of media testing, according to an implementation of the present invention. At block 370 (from method 300), version selection module 215 may determine which version of the game to publicly release and/or continue to test. In one embodiment, at block 510, version X is chosen. A first set of test conditions from version X is then compared in another media test to a second set of test conditions in version Y at block 520. In another embodiment, version X was not chosen at block 510, and therefore at block 530 a first set of test conditions from version Y is compared against a second set of test conditions from version Z in a media test.

Method 500 is itself iterative and therefore the results from blocks 520 and 530 may be used to test "winning" versions from those two blocks against other versions in future media tests. Due the fact that this type of media testing does not require human interaction, complex iterative testing is not only possible, but also highly efficient. Media tests relying on results from previous media tests may be run continuously, and may generate complex frameworks for media analysis.

Figure 6:
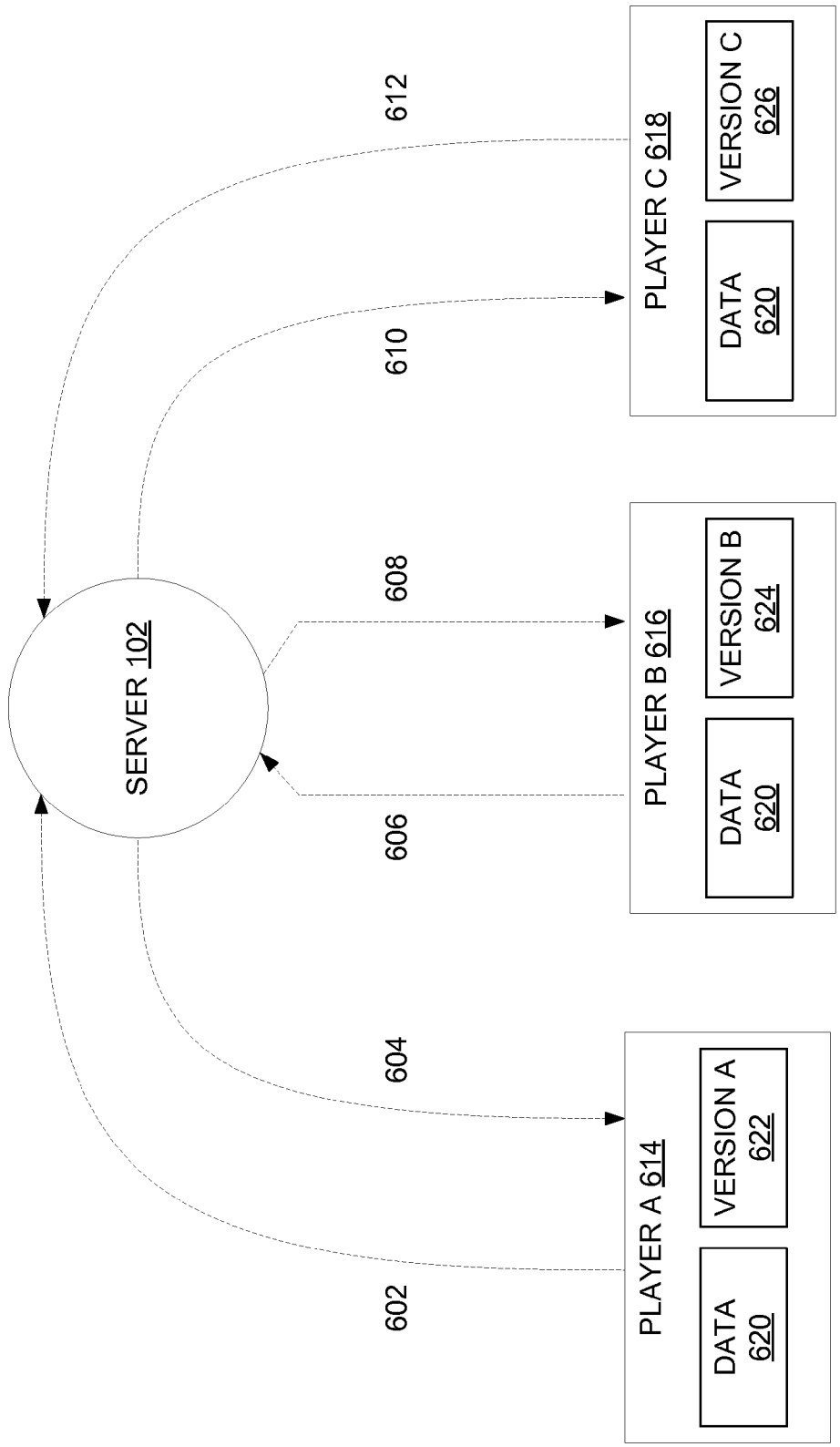
FIG. 6 is a block diagram illustrating a method of assigning new players to a specific version of a game, according to an implementation.

FIG. 6 is a block diagram illustrating a method of assigning new players to a specific version of a game, according to an implementation. In method 600, in one embodiment, players establish a data connection(s) 602, 606, 612 to server 102. Players may connect via user devices 130, 132, 134. In another embodiment, player A 614 may establish a data connection 602 to server 102, player B 616 may also establish a data connection 606 to a server that is not server 102, and player C 618 may connect 608 to yet another server. Connections may all be established by means of network 140 or by individual and different networks.

Once players connect to server 102, server 102 sends 604, 608, 612 each player a version 622, 624, 626 of a game. In one embodiment, player A 614 establishes a data connection 602 to server 102 and receives 604 game version A 622. Player B 616 establishes a data connection 606 to server 102 and receives 608 game version B 624. Player C 618 establishes a data connection 612 to server 102 and receives 610 game version C 626. Game versions 622, 624, 626 may be sent by means of network 140 or by individual and different networks. In one embodiment, game versions 622, 624, 626 are determined by game version module 213 and assigned to each player 614, 616, 618 by player assignment module 214 in media unit 110 on server 102. Data 620, such as test metric values, may continually be sent via data connection(s) 602, 606, 612 to server 102 while data connection(s) 602, 606, 612 remains intact.

Figure 7:
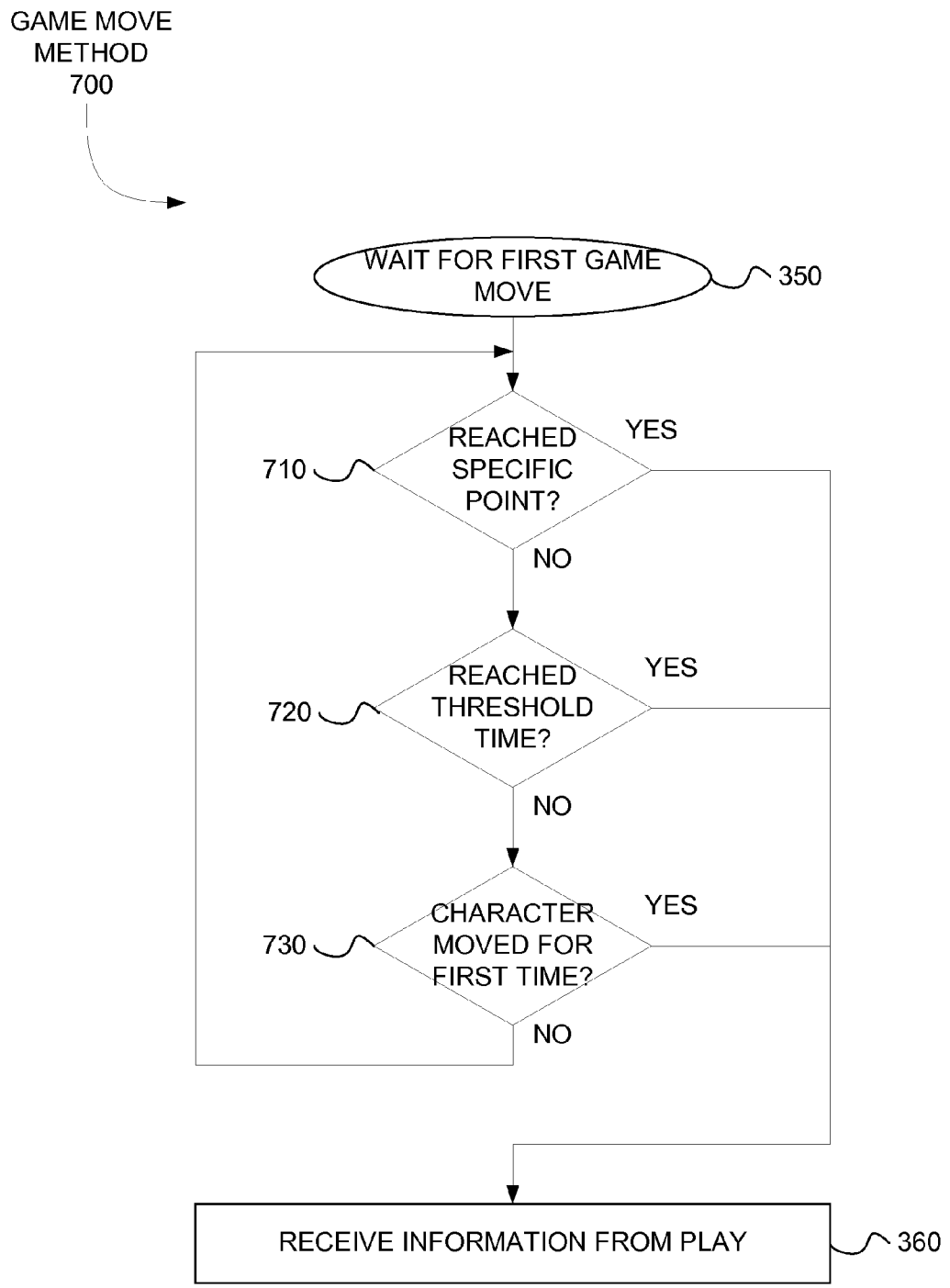
FIG. 7 is a flow diagram illustrating a method for determining whether or not a first game move has been made, according to an implementation.

FIG. 7 is a flow diagram illustrating a method for determining whether or not a first game move has been made, according to an implementation of the present disclosure. Method 700 is a detailed extension of method 300. Method 700 may be performed by player assignment module 214 in media testing unit 110. In one embodiment, very simple yes/no logic is performed to determine whether or not an action by a player qualifies as a first game move. At block 710, if a player has reached a specific point in the game, a first game move has been made and execution jumps to block 360. In one embodiment, a point in a game may be a checkpoint partway through a level, completion of a level, or victory over an opponent. If a player has not reached a specific point in a game, execution flows to block 720. If a player has reached a threshold playing time, a first game move has been made and execution jumps back to block 360. In one embodiment, a threshold playing time may be 2 minutes, 5 minutes, or an hour. Any length of time, however short, may be predetermined. If a player has not yet reached a specific point or time in the game, execution moves to block 730. At block 730, if a player has caused his character to move for the first time, execution continues to block 360. In one embodiment, moving for the first time may be simply causing a character to run for the first time. In another embodiment, it may be moving a first chess piece on a board. If none of 710, 720, or 730 may be answered in the affirmative, method 700 loops back to the start.

In another embodiment, different definitions of a first game move may be used. Additionally, definitions may be used separately or in combination. As an example, in one embodiment, a player may have to both beat the first level and have been playing for five minutes before moving on to block 360. In another embodiment, simply causing a character to run for the first time is sufficient. Not moving on to receiving information from play at block 360 until a first game move is made is beneficial-if data is recorded and analyzed before a player has an opportunity to actually play the game, resulting data and predictions will necessarily be skewed and inaccurate.

Figure 8:
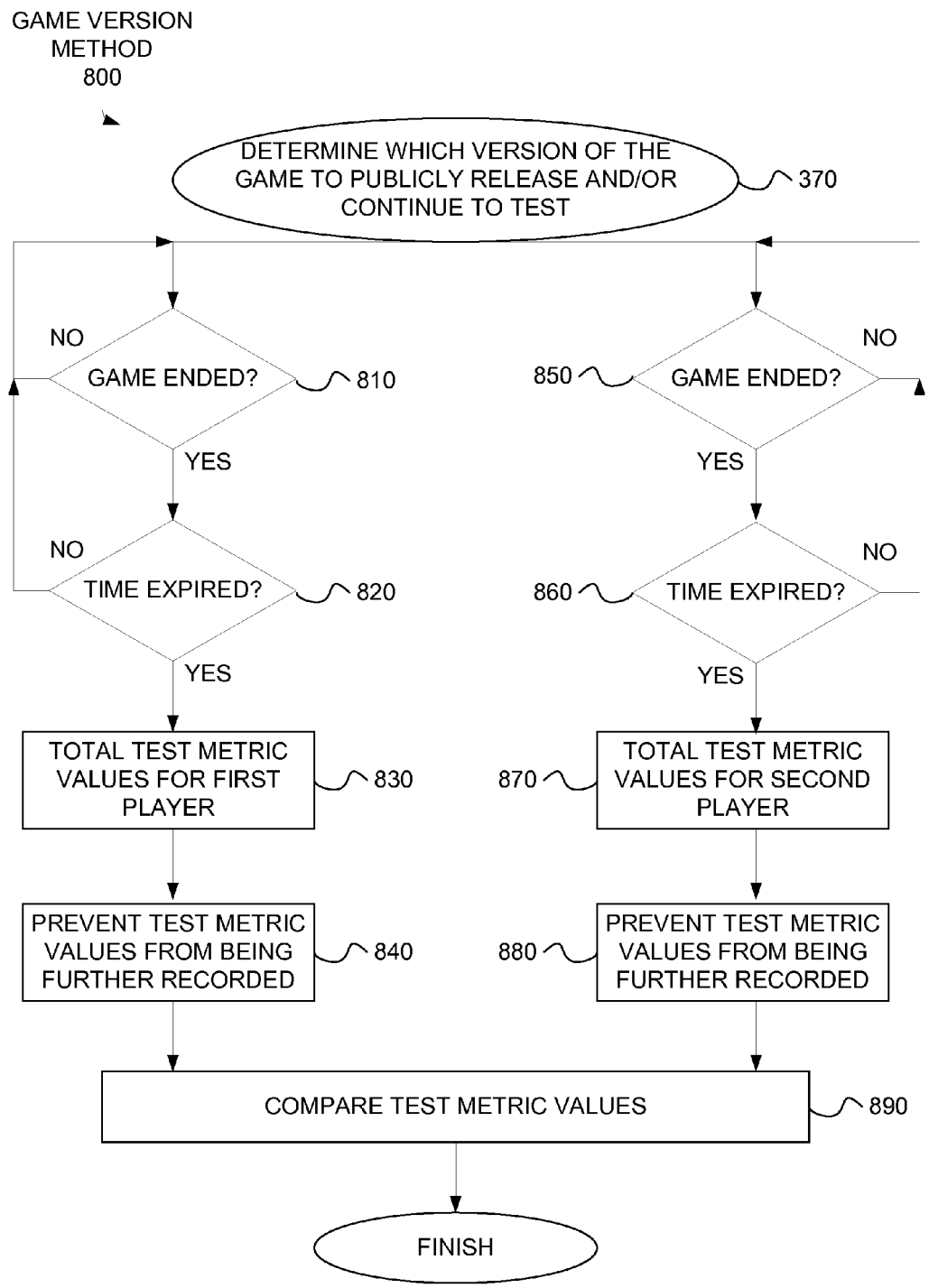
FIG. 8 is a flow diagram illustrating a method for determining which version of a game to publicly release, according to an implementation.

FIG. 8 is a flow diagram illustrating a method for determining which version of a game to publicly release, according to an implementation of the present disclosure. Method 800 begins with a block from method 300, expounding in more detail the process of determining which version to publicly release. Method 800 may be performed by version selection module 215. At block 810, method 800 waits until the first player's game has ended. At block 820, method 800 waits until a threshold of time has been reached before proceeding. In another embodiment, satisfying either 810 or 820 will enable method to proceed to block 830. In another embodiment, some other test is used before proceeding. At block 830, test metric values are totaled for the first player and, at block 840, further recording of test metric values may be disabled. Method 800 may be performed independently for a second player by proceeding through blocks 850-880. Players' test metric values may be independently totaled and prevented from being further recorded.

At block 890, method 800 compares the totaled test metric values for players in the test. Based the totaled test metric values, method 800 determines which version of the game to publicly release. In one embodiment, a single test metric is compared before making a determination. For example, if it is determined that version A of a game earned more total revenue than version B, version A may be publicly released without taking into account any of the other test metrics. In another embodiment, totaled metrics may be analyzed together, using complex statistical analysis such as multivariate regression. While the above example demonstrates a method 800 for only two players, one of ordinary skill in the art would understand that method 800 applies to any sample size.

Figure 9:
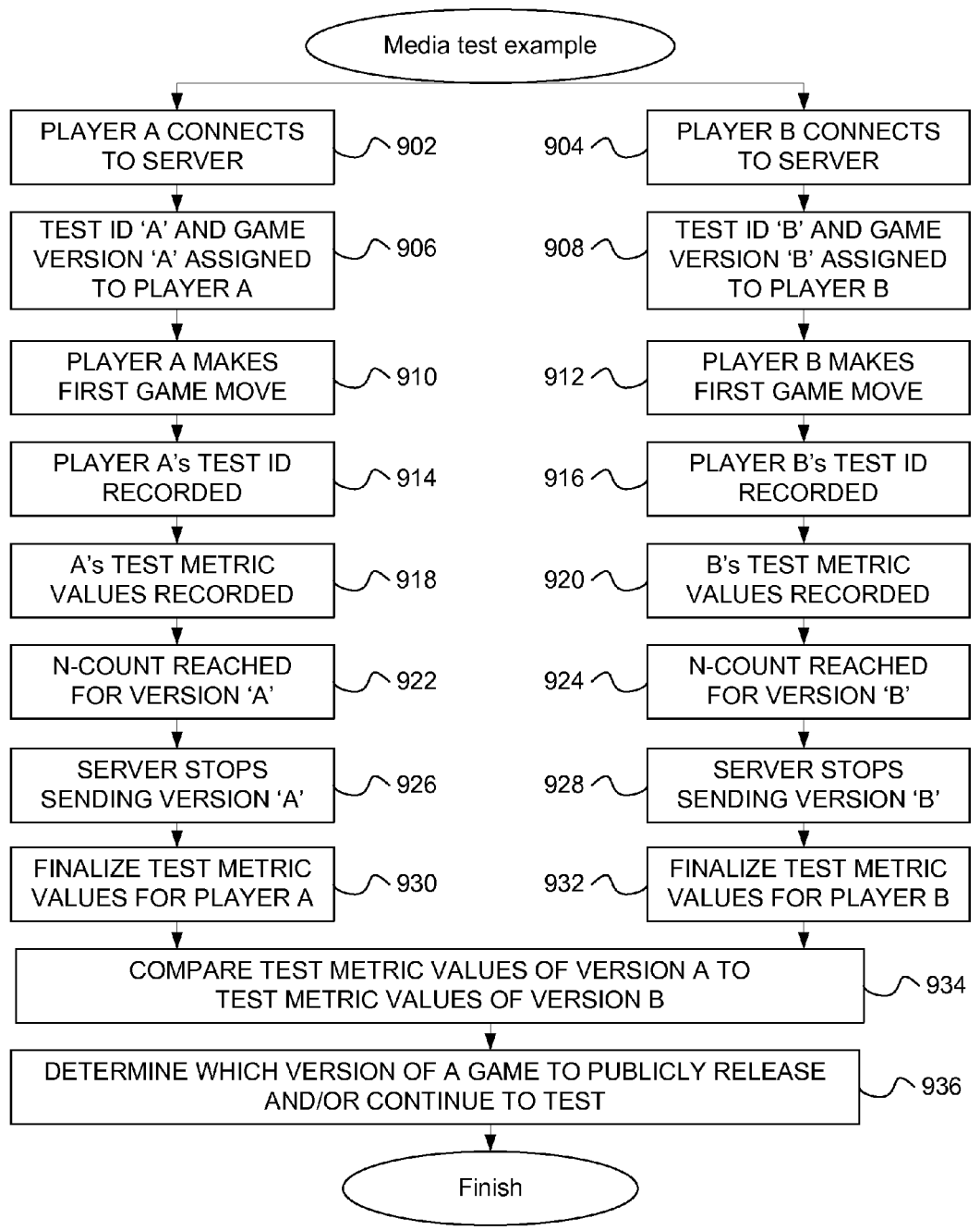
FIG. 9 is a flow diagram illustrating an exemplary method of media testing, according to an implementation.

FIG. 9 is a flow diagram illustrating an exemplary method of media testing, according to an implementation of the present invention. In one embodiment, modules in media testing unit 110 on server 102 may perform media testing. At 902 and 904 players A and B connect to a server. They may both connect to server 102, or each may connect to a different server. At 906 and 908 a server assigns test identifiers and game versions to each of player A and player B. Test identifiers associate a particular player with a particular version of a game. When player A makes a first game move at block 910, his test identifier is recorded along with a time stamp 914. The same thing happens for player B when he completes a first game move in blocks 912 and 916. Test identifiers and time stamps may be stored on data store 222 or elsewhere.

In blocks 918 and 920 test metric values for player A and player B may be continuously received by the media testing unit 110 and stored in Data store 222. In another embodiment, test metric values may be stored elsewhere. Once N-count thresholds are met for a particular version of the game 922, 924, media testing unit 110 stops sending that particular version of the game to new players of the game. This is represented at blocks 926 and 928 of FIG. 9. At blocks 930 and 932, test metric values are finalized for each of the players. Metrics are totaled and further recording in prevented. At block 934, totaled test metric values from version A of the game are compared against totaled test metric values from version B of the game. In a typical media test, there would be more than one player in each group assigned to version A and version B. The results for every member of the group assigned to version A would be totaled and compared to the totaled results for every member of group B (the group assigned to version B). Additionally, there may be more than two versions of the game being tested simultaneously. A person with ordinary skill in the art would understand that many versions of the game with many players in each group might be tested using this method. For example, in a single test version A may be compared against versions (groups) B, C, D, E, etc. . . . . Based on comparison of the test metric values at block 934, a version of the game to be publicly released and/or tested further is determined at block 936. This process is iterative and thus when a round of testing is completed, a new one using results from prior tests may begin.

Figure 10:
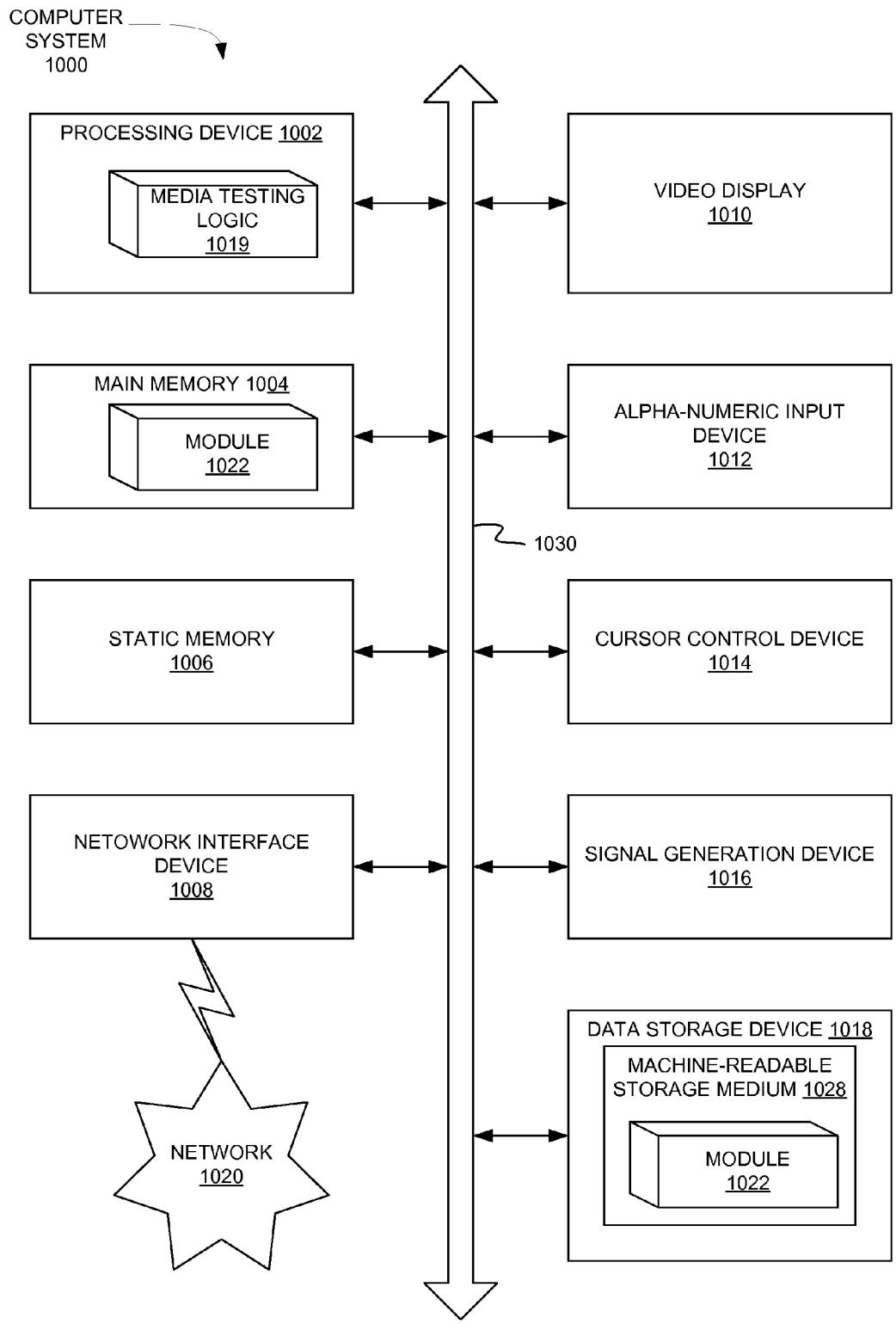
FIG. 10 is a block diagram of a service device in the example form of a computing device, according to an implementation.

FIG. 10 illustrates a diagrammatic representation of a server 102 in the example form of a computing device within which a set of instructions, for causing the machine to perform any one or more of the methodologies discussed herein, may be executed. The server 102 may be in the form of a computing device (e.g., a server computer) within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example server 102 includes a processing device 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)) and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute media testing logic 1019 for performing the operations and steps discussed herein.

The server 102 may further include a network interface device 1008 which may communicate with a network 1020. The server 102 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and a signal generation device 1016 (e.g., a speaker). In one embodiment, the video display unit 1010, the alphanumeric input device 1012, and the cursor control device 1014 may be combined into a single component or device (e.g., an LCD touch screen).

In one embodiment, data storage device 1018 may represent storage device 120. The data storage device 1018 may include a computer-readable medium 1028 on which is stored one or more sets of instructions (e.g., instructions of module 1022, such as an identifier module or a data store module) embodying any one or more of the methodologies or functions described herein. The module 1022 may (e.g., an identifier module or a data store module) also reside, completely or at least partially, within the main memory 1004 and/or within the processing device 1002 during execution thereof by the server 102, the main memory 1004 and the processing device 1002 also constituting computer-readable media. The instructions may further be transmitted or received over a network 1020 via the network interface device 1008.

While the computer-readable storage medium 1028 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "analyzing," "testing," "identifying," "sending," "totaling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    assigning a unique identifier to each of a plurality of players of a game in response to each of the plurality of players logging in to the game by connecting to a server for a first time;
    associating a version of a plurality of versions of the game with the unique identifier of each of the plurality of players of the game;
    recording a first game move made by each of the plurality of players during play of the plurality of versions of the game and the unique identifier of each of the plurality of players of the game that made the first game move during play of the plurality of versions of the game;
    in response to recording the first game move made by each of the plurality of players during play of the plurality of versions of the game and the unique identifier of each of the plurality of players of the game that made the first game move during play of the plurality of versions of the game, receiving information from play of the plurality of versions of the game by each of the plurality of players;
    testing, by a processing device and without human interaction, the plurality of versions of the game, wherein each of the plurality of versions of the game has a different set of test conditions using the information received from play of the plurality of versions of the game by each of the plurality of players after the first game move has been made by each of the plurality of players during play of the plurality of versions of the game;
    determining, without human interaction, which of a version of the game from the plurality of versions of the game to publicly release based on the testing; and
    in response to determining which of the version of the game from the plurality of versions of the game to publicly release based on the testing, publicly releasing, without human interaction, the version of the game from the plurality of versions of the game.

2. The method of claim 1, wherein a first set of test conditions utilized in the version of the game to publicly release is used in a subsequent testing of the game, and wherein the first set of test conditions is tested against a second set of test conditions in a new version of the game.

3. The method of claim 2, wherein each of the first and second set of test conditions comprise at least one of:
    price point of in-game item, size of reward, timing of reward, existence of a paywall, timing of a paywall, advertising presence, or length of advertising.

4. The method of claim 1, wherein testing the plurality of versions of the game further comprises:
    sending a first version of the game with a first set of test conditions to a first player when the first player connects to a first server for a first time; and
    sending a second version of the game with a second set of test conditions to a second player when the second player connects to a second server for a first time.

5. The method of claim 4, where the first server and the second server are a same server.

6. The method of claim 4, where the first server and the second server are different servers.

7. The method of claim 4, wherein the first game move comprises at least one of:
the first or second player reaching a point in the game, reaching a threshold of playing time, or causing a game character to move for a first time.

8. The method of claim 4, wherein determining which of the version of the game from the plurality of versions of the game to publicly release based on the testing comprises:
totaling test metric values for the first player once the game has ended and a threshold of time has expired;
totaling test metric values for the second player once the game has ended and a threshold of time has expired; and
preventing test metric values from being further recorded for each of the first and second player.

9. The method of claim 1, wherein the information received from play of the plurality of versions of the game by each of the plurality of players comprises at least one of the following test metrics:
total revenue, average revenue per user, average revenue per subscriber, retention rate, length of play session, conversion rate, or ad revenue.

10. The method of claim 1, wherein the information received from play of the plurality of versions of the game by each of the plurality of players is received when at least one of:
a first or second player's test metric value changes, or periodically according to an interval of time.

11. The method of claim 1, wherein the server comprises a first server machine and the processing device is associated with a second server machine.

12. A non-transitory machine-readable storage medium storing instructions which, when executed, cause a processing device to:
assign a unique identifier to each of a plurality of players of a game in response to each of the plurality of players logging in to the game by connecting to a server for a first time;
associate a version of a plurality of versions of the game with the unique identifier of each of the plurality of players of the game;
record a first game move made by each of the plurality of players during play of the plurality of versions of the game and the unique identifier of each of the plurality of players of the game that made the first game move during play of the plurality of versions of the game;
in response to recording the first game move made by each of the plurality of players during play of the plurality of versions of the game and the unique identifier of each of the plurality of players of the game that made the first game move during play of the plurality of versions of the game, receive information from play of the plurality of versions of the game by each of the plurality of players;
test, without human interaction, the plurality of versions of the game, wherein each of the plurality of versions of the game has a different set of test conditions using the information received from play of the plurality of versions of the game by each of the plurality of players after the first game move has been made by each of the plurality of players during play of the plurality of versions of the game;
determine, without human interaction, which of a version of the game from the plurality of versions of the game to publicly release based on the testing; and
in response to determining which of the version of the game from the plurality of versions of the game to publicly release based on the testing, publicly release, without human interaction, the version of the game from the plurality of versions of the game.

13. The non-transitory machine-readable storage medium of claim 12, wherein a first set of test conditions utilized in the version of the game to publicly release is used in a subsequent testing of the game, and wherein the first set of test conditions is tested against a second set of test conditions in a new version of the game.

14. The non-transitory machine-readable storage medium of claim 12, wherein to test the plurality of versions of the game the processing device is to:
send a first version of the game with a first set of test conditions to a first player when the first player connects to a first server for a first time; and
send a second version of the game with a second set of test conditions to a second player when the second player connects to a second server for a first time.

15. The non-transitory machine-readable storage medium of claim 14, where the first server and the second server are a same server.

16. The non-transitory machine-readable storage medium of claim 14, where the first server and the second server are different servers.

17. The non-transitory machine-readable storage medium of claim 14, wherein the first game move comprises at least one of:
the first or second player reaching a point in the game, reaching a threshold of playing time, or causing a game character to move for a first time.

18. The non-transitory machine-readable storage medium of claim 12, wherein the information received from play of the plurality of versions of the game by each of the plurality of players is received when at least one of:
a first or second player's test metric value changes, or periodically according to an interval of time.

19. The non-transitory machine-readable storage medium of claim 12, wherein the server comprises a first server machine and the processing device is associated with a second server machine.

\* \* \* \* \*